United States Patent [19]

Beech et al.

[11] Patent Number: 4,941,344
[45] Date of Patent: Jul. 17, 1990

[54] DIE SETS

[75] Inventors: Brian J. Beech, West Midlands; Edwin T. Beech, Tamworth, both of England

[73] Assignee: Sildean Limited, Birmingham, England

[21] Appl. No.: 268,152

[22] Filed: Nov. 7, 1988

[30] Foreign Application Priority Data

Nov. 7, 1987 [GB] United Kingdom ............... 8726155

[51] Int. Cl.⁵ .............................................. B21D 37/10
[52] U.S. Cl. ......................................... 72/456; 384/30; 403/261; 403/338
[58] Field of Search ............. 72/456; 384/30; 403/13, 403/14, 261, 337, 338; 269/91, 93

[56] References Cited

U.S. PATENT DOCUMENTS

| | | | |
|---|---|---|---|
| 1,921,421 | 8/1933 | Morsilius | 384/30 |
| 2,076,207 | 4/1937 | Powell | 269/91 |
| 2,303,031 | 11/1942 | Dusevoir | 403/338 |
| 2,404,385 | 7/1946 | Fritts | 403/337 |
| 2,405,825 | 8/1946 | Grunon | 72/456 |
| 2,637,249 | 5/1953 | Swenson | 269/91 |
| 2,751,260 | 6/1956 | Janiszewski | 304/30 |
| 2,981,569 | 4/1961 | Danly | 384/30 |
| 3,219,371 | 11/1965 | Danly | 287/20 |
| 3,222,053 | 12/1965 | Severdia | 269/91 |
| 3,273,944 | 9/1966 | Hammon | 384/30 |
| 3,279,870 | 10/1966 | Janiszewski | 384/30 |
| 3,386,781 | 6/1968 | Blazek | 308/4 |
| 3,544,139 | 12/1970 | Sharples | 287/20 |
| 3,623,718 | 11/1971 | Thomeczek | 269/91 |
| 3,871,226 | 3/1975 | Janiszewski | 72/456 |
| 4,033,701 | 7/1977 | Labyer et al. | 403/13 |
| 4,065,846 | 1/1978 | Leonard, Jr. | 403/338 |

FOREIGN PATENT DOCUMENTS

| | | |
|---|---|---|
| 419336 | 10/1925 | Fed. Rep. of Germany . |
| 2335726 | 7/1977 | France ............... 72/456 |
| 0898127 | 1/1982 | U.S.S.R. ............ 403/13 |
| 838116 | 5/1982 | U.S.S.R. . |
| 2123507 | 2/1984 | United Kingdom . |

OTHER PUBLICATIONS

"One-Piece Blind Fastener", Xerox Disclosure Journal, p. 125, vol. 7, No. 2, Apr. 1982.

Primary Examiner—David Jones
Attorney, Agent, or Firm—Neil F. Markva

[57] ABSTRACT

A die set having a pillar slidable in a bush which are secured to plates, to maintain alignment of the plates, by connector devices which comprises clamping members clamped by fasteners to the plates so that clamping surfaces abut abutment surfaces on flanges on the pillar and bush; and the surfaces are inclined so that the clamping members are driven radially outwards by the flanges if the pillar and bush seize together.

8 Claims, 2 Drawing Sheets

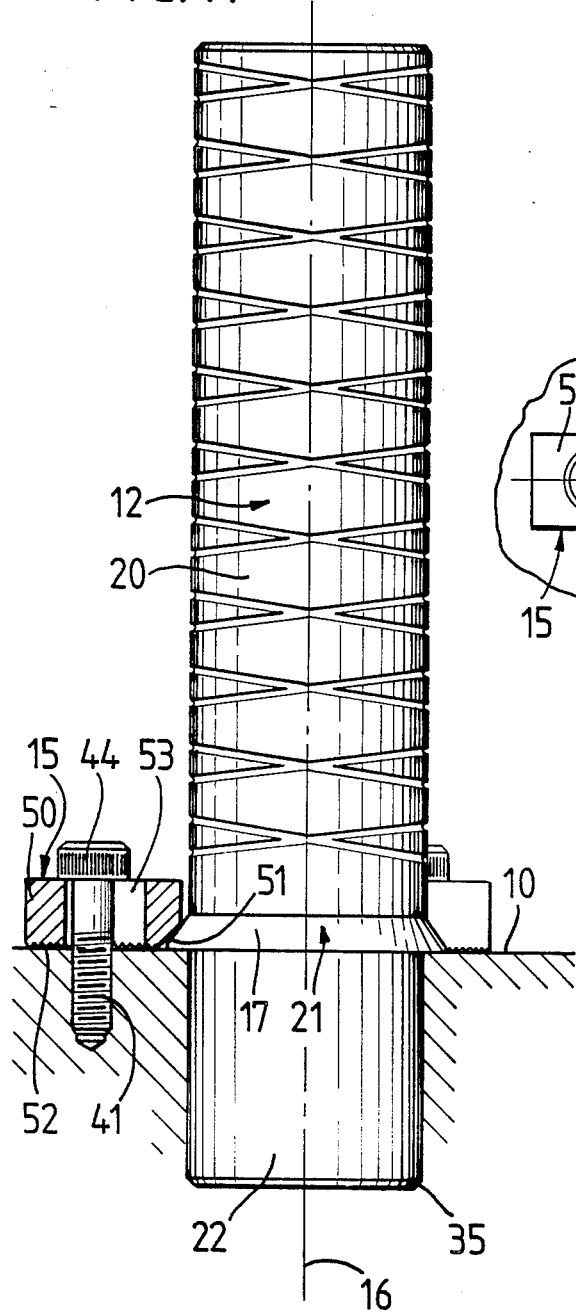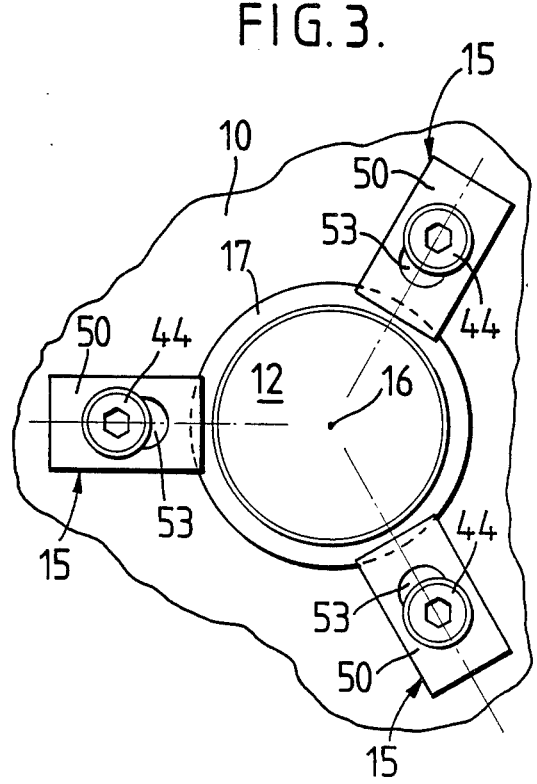

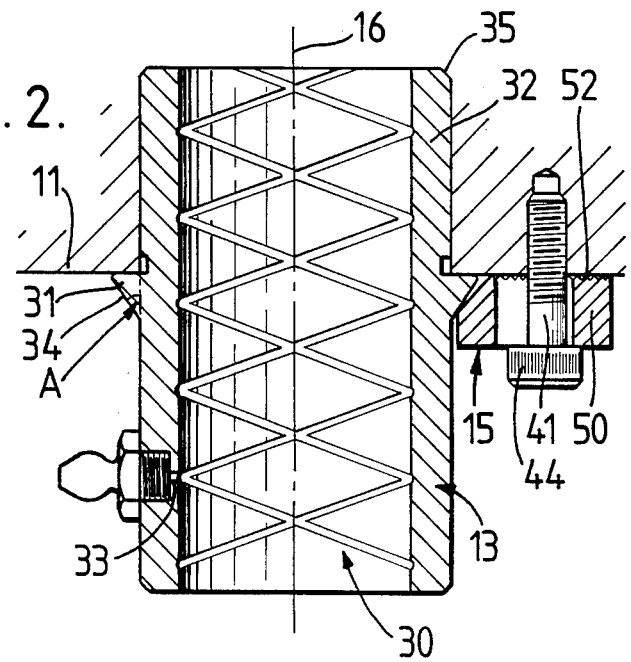
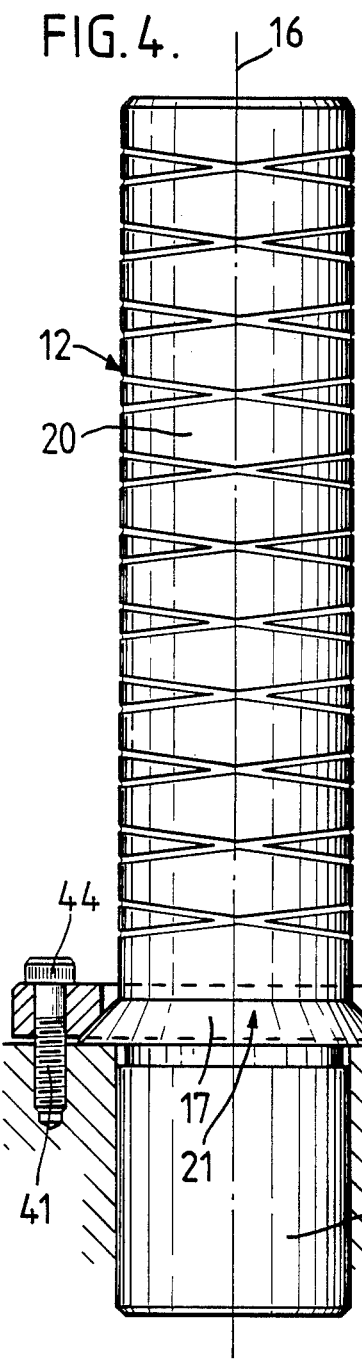
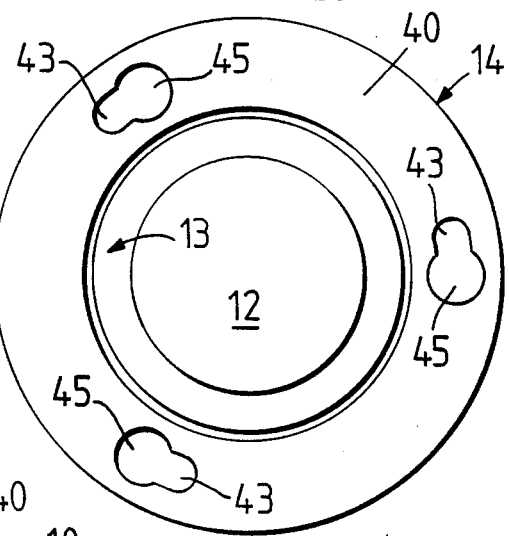

DIE SETS

FIELD OF THE INVENTION

This invention concerns die sets, and pillar and bush devices for die sets.

BACKGROUND OF THE INVENTION

Die sets are known which comprise a top plate, a bottom plate, and at least two pillar and bush devices in each of which a bush is mounted in one of the plates to slidably receive a pillar secured to the other of the plates, to ensure that the plates maintain a specific mutual orientation while one plate is moved to vary the distance between the plates, for causing die tools, mounted on the plates, to operate upon a workpiece placed between the tools in known manner.

The working surfaces of the pillars are necessarily a close sliding fit in the bushes, and wear thereof is detrimental to the maintenance of said orientation; and to reduce the problems caused by such wear it is known to:

(a) line the bushes with a bearing material such as phosphor-bronze, and provide grease distribution grooves in the lined internal surface of the bushes; and (b) make the pillar and bush device separable from the plates so that a worn pillar or bush can be replaced.

However, these known expedients give rise to further problems of cost, complexity and vulnerability to damage without overcoming the wear and other problems. For example, the pillars can sieze in the bushes, e.g. because of inadequate lubrication or damage to the bushes caused by metal particles becoming embedded in or scoring the lining of bearing material, and such seizures can cause catastrophic damage to the die sets.

An object of the invention is to reduce the risk of such catastrophic damage arising.

SUMMARY OF THE INVENTION

In general, to overcome such problems and reduce said risk the present invention provides a pillar and bush device, in or for use in a die set, in which the pillar and/or the bush is or are secured or securable releasably to the respective plate or plates of the die set by connector means adapted to yield upon seizure of the pillar in the bush, thereby allowing said pillar and bush to move in unison relative to one of the plates.

More particularly the present invention provides a pillar and bush device, for a die set having separable plates, wherein the device comprises a bush, a pillar slidable in and co-axial with the bush, and connector devices for securing the pillar and the bush to the plates. At least one said connector device comprises at least one clamp member having a clamping surface which engages an abutment surface on a collar on the pillar or bush, with at least one of said surfaces being inclined at an acute angle to said axis so that an axially directed force applied to said collar generates a radially directed force component on said clamp member. The clamp member is releasably clampable to one of said plates by a threaded fastener to resist said axially directed force component.

The present invention further provides in a die set, having a first plate and a second plate, a pillar and bush device comprising a bush releasably secured in said first plate by first connector means, a pillar releasably secured in said second plate by second connecting means and co-axial with and slidable in said bush. The bush comprises a first collar clamped to said first plate by said first connecting means and said pillar comprises a second collar clamped to said second plate by said second connecting means. At least one of said collars provides an abutment surface. The first connecting means is releasably clamped to said first plate by first fastener means and said second connecting means is releasably clamped to said second plate by second fastener means. At least one of said connecting means provides a clamping surface which is engaged in cam-engagement with said abutment surface at an angle inclined to said axis to transmit part of an axially directed force applied to said abutment surface during separation of said plates as a force acting radially outwards upon said clamping surface.

The present invention also provides a pillar and bush device, for or in a die set, wherein the pillar and bush are co-axial and are releasably securable to respective plates of the die set by respective connector means. Each connector means comprises an annular flange on the pillar or bush, at least one clamp member providing a clamping surface engageable with a projecting abutment surface on the flange, and a plurality of threaded fasteners for clamping the clamp members to the plates of the or a die set. The clamping and/or said abutment surfaces are inclined at an acute angle to the axis of the device.

The pillar and bush preferably each comprise an elongate cylindrical external locating surface which is a close fit in a socket in the respective plate, and said locating surface preferably extends to a chamfered or tapered end of the pillar or bush.

The present invention further provides a pillar and bush device, in or for a die set, wherein the pillar has a working surface having a titanium nitride coating.

The present invention also provides a pillar and bush device, in or for a die set, wherein at least one of the pillar and the bush has an annular collar provided with keyhole sockets. The device includes a plurality of threaded fasteners dimensioned so that the heads thereof can pass through the larger diameter parts of the sockets but not through the narrower parts of the sockets, so that, when the fasteners are engaged in a plate of a or the die set, the collar may be moved arcuately between a position in which it is removable from the plate and a position in which it is constrained by the heads. The collar may comprise a ring separable from the pillar or bush and engageable with a flange on the pillar or bush; or may comprise a flange integral with the pillar or bush.

In order to reduce the risk of seizure, the present invention further provides a pillar and bush device, for or in a die set, in which the bush has internal grease grooves. The internal surface of the bush is hardened, and the external working surface of the pillar is transversely grooved and is hardened or coated with a layer of a wear resistant material, such as titanium nitride. Thus, contrary to the standard practice of making the working surface of the pillar as smooth as possible to reduce friction and the picking up of metallic particles, in the above devices the grooved pillar surfaces may well pick up more particles but such particles are easily displaced into the grooves without harming the bushes or the pillars. Furthermore, contaminated grease is expelled from the grooves during greasing due to the grooves on the pillar cooperating with the grooves in the bushes to provide a grease discharge path. Wear and damage are considerably reduced in an inexpensive manner.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIGS. 1 and 2 are partial cross sectional views which respectively show a pillar and a bush of a device of the invention, in position in plates of a die set; and FIG. 3 shows a plan view of a main form of connecting means of the device of FIG. 1;

FIG. 4 is a partial cross sectional view of a device of the invention showing a quick release form of connecting means for the device; and FIG. 5 is a top plan view of the connecting means of FIG. 4.

DETAILED DESCRIPTION

The die set comprises a static bottom plate 10, a movable upper plate 11 (shown), and die tools (not shown), together with the device.

The device comprises a pillar 12, a bush 13 and connecting devices or connector means 14 or 15, all of steel.

The pillar 12 has a helically grooved working surface 20, which is coated with a thin titanium nitride deposit, a collar in the form of an annular integral flange 21, and a plug end portion 22 which is located in a socket in the plate 10.

The bush 13 has an internal surface defining a guide bore 30, which surface is hardened and provided with grooves, has a grease duct 33 to convey grease to the grooves, and has a collar in the form of an annular integral flange 31 adjacent a plug end portion 32 which is located in a socket in the plate 11.

The flanges 21,31 each provide a plate abutment surface in a plane normal to the common axis 16 of the pillar and bush. The flange 21 has a part conical abutment surface 17, and the flange 31 has a part-conical abutment surface 34.

Each main form of connecting means 15, shown in FIGS. 1,2 and 3 comprises a plurality of clamp members 50, each of which provides an inclined clamping surface 51, a serrated plate engagement surface 52 and a slot 53 for a threaded fastener 41 insertable into the plate 10 or 11 to clamp the member 50 to the plate. Each slot is elongate in a direction radial to the axis 16 of the pillar and bush to permit radial movement of the block 50 when the clamping pressure of the fastener 41 is released.

The abutment and clamping surfaces 17, 34 and 51 are inclined to the axis at an acute angle, so that, in use, any axially directed force applied to the pillar and bush during separation of the plates, due to friction between the pillar and bush, is imparted, via the collars 21 and 31, to the clamp members; and, because each of the interengagements between the abutment surfaces 17 and 34 and the clamping surfaces 51 is inclined at an acute angle to said axis, said force imparts a radially outwardly force component upon the clamping members, which force component is easily resisted and withstood by the clamping forces of the fasteners of the connecting means in normal operation. However, in the event of seizure of the pillar in the bush, the force and its resultant radial force component increases very greatly and either halts separation of the plates or overcomes the clamping force so that one or each of the collars 21 and 31 serves as a linear cam to drive the clamping members 15 radially outwards, thus allowing and releasing the pillar 12 or bush 13 to slide in the socket in the respective plate until the drive to the die set can be halted either manually or by a sensor controlled automatic press-tool control system.

Although clamping surfaces 17, 34 and 51 may be inclined at the same angle, e.g. 45°, it is preferred to incline the surface 34 of the bush more steeply e.g. so that the angle A is about 55°, to increase the radial force component produced by the bush 13 to cause the latter to be released by the connector device in preference to the pillar 12.

Upon release, the external cylindrical surface of the plug end portion 32 (or 22) will slide in the respective socket; and to facilitate re-entry of the plug end portion into the socket the end of said portion preferably has a chamfer 35 or taper.

If desired, the pillar 12 (or the bush 13) may have quick release connecting means 14 shown in FIGS. 4 and 5, which comprises a collar, in the form of an annular ring 40, and a plurality of threaded fasteners 41. The ring 40 is formed to provide a part conical clamping surface 42 and three keyhole sockets 43 dimensioned so that the heads 44 of fasteners 41 can pass through the larger ends 45 of the sockets 43 but not through the remainder.

In use, the fasteners 41 engage in threaded sockets in the plates 10 to clamp the flange 21 between the ring 40 and the plates 10. To release the pillar 12 it is only necessary to retract the fasteners 44 slightly from the sockets to remove the clamping pressure, to turn the ring 40 until the fastener heads 44 align with the ends 45, to move the ring 40 axially away from the plate 10, and to draw or push the pillar 12 from the plate 10.

Both forms of connecting means 14 and 15 provide for simple manual release of the pillar 12 and bush 13; are self-aligning during clamping of the pillar 12 and bush 13; accommodate wide manufacturing tolerances in their own construction and those of the flanges to reduce manufacturing costs; and provide secure and accurate clamping of the pillar 12 and bush 13 to reduce the risks of damage to and localized wear of the device.

The inclination of the abutment and clamping surfaces 17, 34 and 51 is preferably about 40° to 70° to the axis, and in the examples shown is about 45° except possibly for the surface 34. In the main form of retaining means 15, only one of the clamping and abutment surfaces needs to be so inclined to the axis, and the other of the surfaces may, for example, lie in a plane normal to the axis so that its peripheral edge abuts the inclined one of said surfaces. In the quick release retaining means 14, the surfaces may all be radial to the axis to abut in a plane normal to the axis.

We claim:

1. In a die set, having a first plate and a second plate, a pillar and bush device comprising:
   (a) a bush releasably secured in said first plate by first connector means,
   (b) a pillar releasably secured in said second plate by second connector means and co-axial with and slidable in said bush,
   (c) said bush including a first collar clamped to said first plate by said first connector means,
   (d) said pillar including a second collar clamped to said second plate by said second connector means, (e) at least one of said collars provides an abutment surface, (f) said first connector means is releasably clamped to said first plate by first fastener means and said second connector means is releasably clamped to said second plate by second fastener means, and (g) at least one of said connector means including a clamping surface which is engaged in cam engagement with said abutment surface at an angle inclined to said axis to transmit part of an axially directed force applied to said abutment surface during separation of said plates as a force acting radially outwards upon said clamping surface, (h) a second one of said connector means including a plurality of threaded fasteners and an annular collar around the pillar or bush, (i) said collar having keyhole shaped sockets therein dimensioned so that the heads of the fasteners can pass through the larger diameter parts of the sockets but not through the narrower parts of the sockets, so that, when the fasteners are engaged in a plate of the die set, the collar may be moved arcuately between a position in which it is removable from the plate and a position in which it is constrained by the heads.

2. A pillar and bush device as claimed in claim 1 wherein the pillar and bush each include a plug end portion locatable in a socket in a respective one of the plates, and said plug end portion has a chamfered or tapered end.

3. In a die set, having a first plate and a second plate, a pillar and bush device comprising:

(a) a bush releasably secured in said first plate by first connector means;

(b) a pillar releasably secured in said second plate by second connector means and co-axial with and slidable in said bush;

(c) said bush including a first collar clamped to said first plate by said first connector means;

(d) said pillar including a second collar clamped to said second plate by said second connector means;

(e) at least one of said collars includes an abutment surface;

(f) said first connector means is releasably clamped to said first plate by said first fastener means and said second connector means is releasably clamped to said second plate by second fastener means;

(g) at least one of said connector means including a clamp member having a clamping surface which is engaged in cam engagement with said abutment surface at an angle inclined to said axis to transmit part of an axially directed force applied to said abutment surface during separation of said plates as a force acting radially outwards upon said clamping surface;

(h) said clamp member including a plate engagement surface, and a radially elongate fastener receiving slot.

4. A pillar and bush device as claimed in claim 3 wherein said clamping and abutment surfaces are inclined to said axis at an angle or angles within the range of 30° to 70°, and the pillar and bush each include a plug end portion locatable in a socket in a respective one of the plates, and said plug end portion has a chamfered or tapered end.

5. A pillar and bush device as claimed claim 3 wherein the bush has internal grease grooves located along a case-hardened internal surface, and the external working surface of the pillar is transversely grooved and is hardened or coated with a layer of a wear resistant material.

6. A pillar and bush device as claimed in claim 3 wherein the pillar has a working surface having a titanium nitride coating.

7. A pillar and bush device as claimed in claim 3 wherein said one of said surfaces is an abutment surface located on the bush.

8. A pillar and bush device as claimed in claim 4 wherein said abutment surface of the bush is inclined at an angle of about 35° to said axis, and the abutment surface of the pillar and the clamping surfaces are inclined at an angle of about 45° to said axis.

* * * * *